United States Patent
Davidson et al.

(10) Patent No.: US 11,518,071 B2
(45) Date of Patent: Dec. 6, 2022

(54) RAPID HEAT CYCLE MOLDING

(71) Applicant: Arris Composites Inc., Berkeley, CA (US)

(72) Inventors: Erick Davidson, Piedmont, CA (US); Ethan Escowitz, Berkeley, CA (US); Arnaud Dyen, San Francisco, CA (US); Christopher Bender, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 17/370,161

(22) Filed: Jul. 8, 2021

(65) Prior Publication Data
US 2022/0009136 A1 Jan. 13, 2022

Related U.S. Application Data

(60) Provisional application No. 63/050,596, filed on Jul. 10, 2020.

(51) Int. Cl.
*B29C 43/52* (2006.01)
*B29C 70/46* (2006.01)
*B29K 101/12* (2006.01)

(52) U.S. Cl.
CPC .............. *B29C 43/52* (2013.01); *B29C 70/46* (2013.01); *B29K 2101/12* (2013.01); *B29K 2995/0039* (2013.01)

(58) Field of Classification Search
None
See application file for complete search history.

(56) References Cited

U.S. PATENT DOCUMENTS

| 4,490,321 | A | 12/1984 | Klinkau |
| 2020/0114596 | A1 | 4/2020 | Davidson et al. |

FOREIGN PATENT DOCUMENTS

| CN | 110000889 | 7/2019 |
| WO | 2015/052375 A1 | 4/2015 |

OTHER PUBLICATIONS

Authorized Officer Thierry Klinger, International Search Report and Written Opinion dated Oct. 29, 2021 issued in PCT Patent Application No. PCT/US2021/040804.
Fixture and Method for Use in a Molding Process, U.S. Appl. No. 16/877,236, filed May 18, 2020.

*Primary Examiner* — Robert J Grun
(74) *Attorney, Agent, or Firm* — Kaplan Breyer Schwarz, LLP

(57) ABSTRACT

A method for rapid heat cycle compression molding comprises placing an assemblage of feed constituents in a mold, placing the mold between two hot platens of a hot press, heating the mold by pressing the two hot platens against the mold, placing the mold between two cold platens of a cold press, cooling the mold by pressing the two cold platens against the mold, and ejecting the part from the mold.

15 Claims, 3 Drawing Sheets

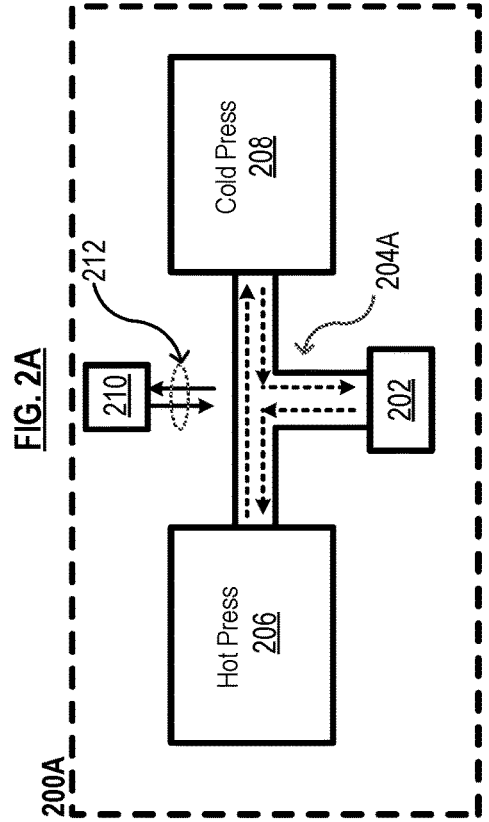
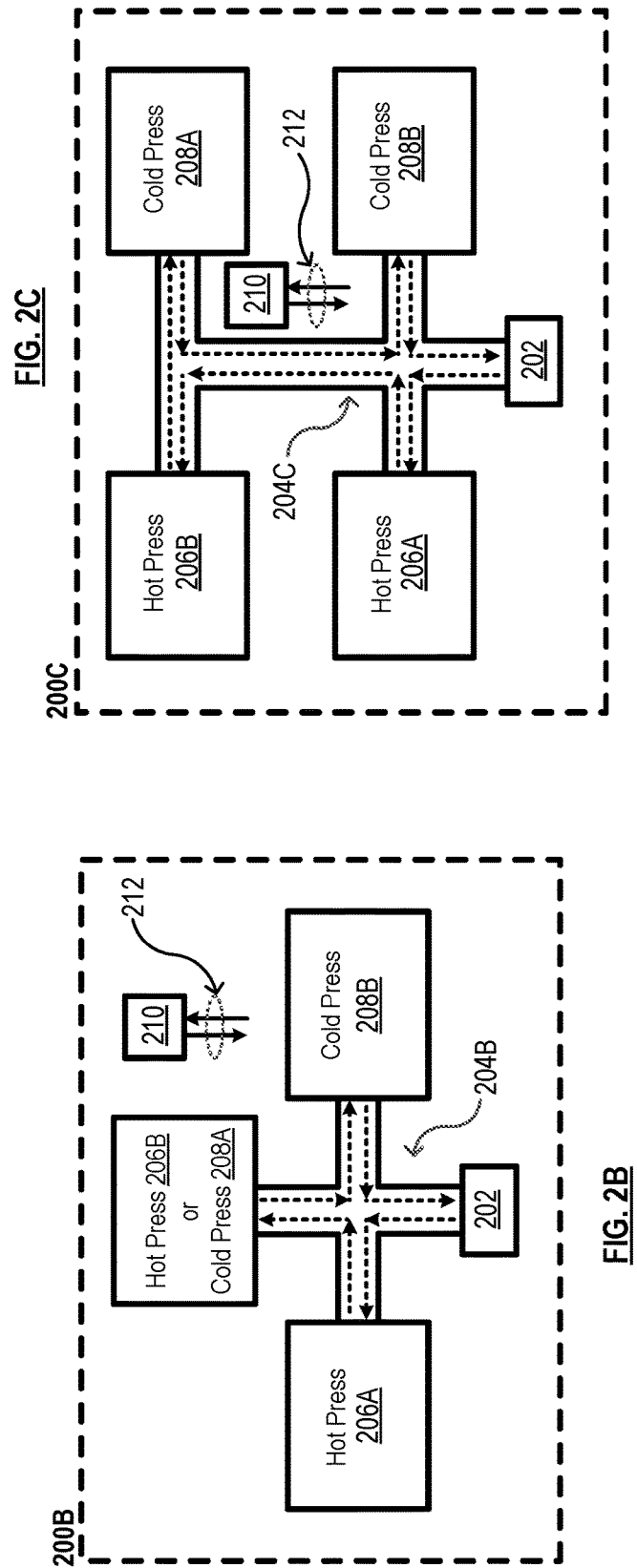

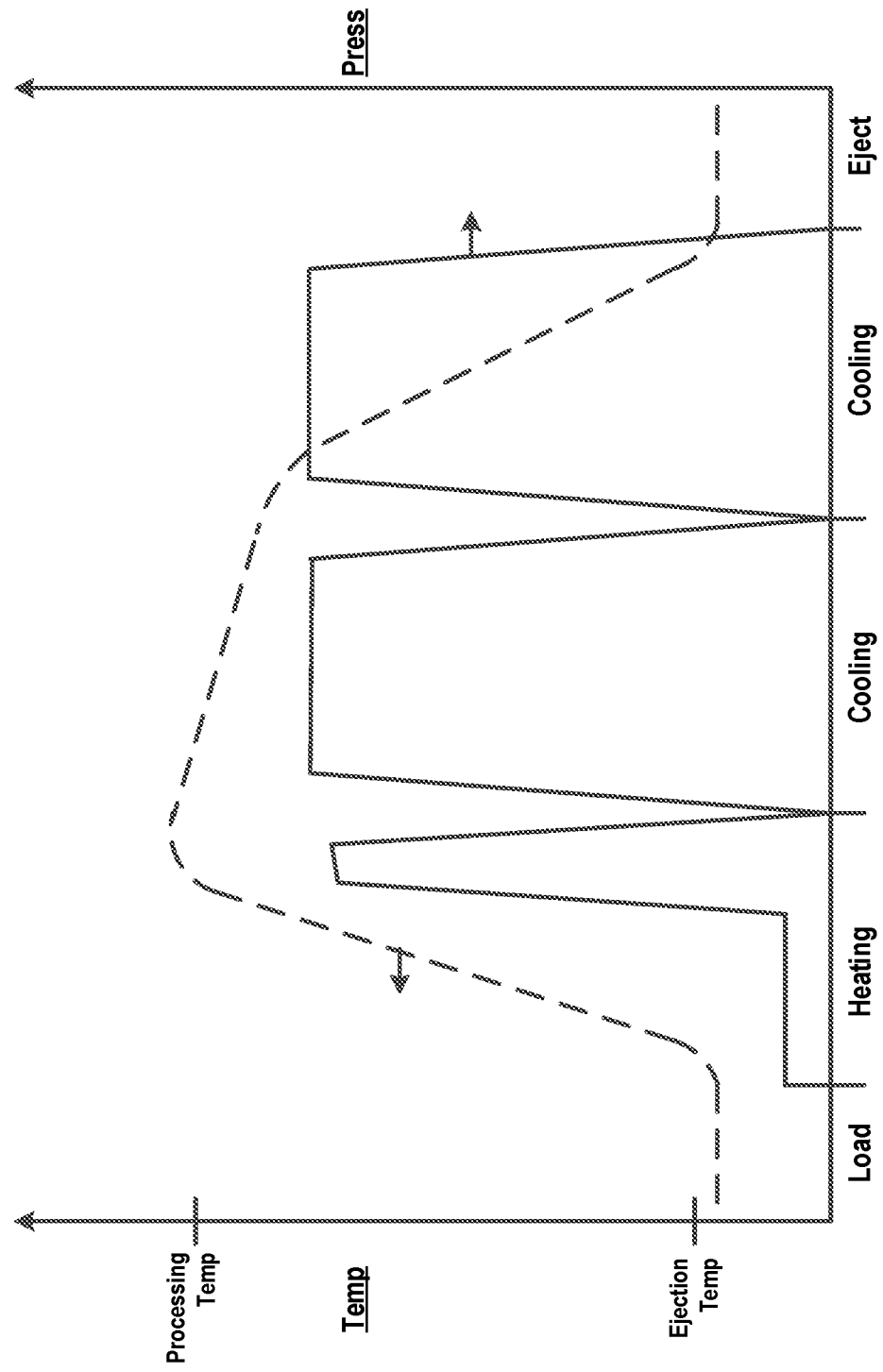

RAPID HEAT CYCLE MOLDING

STATEMENT OF RELATED CASES

This case claims priority of U.S. Pat. App. Ser. No. 63/050,596 filed Jul. 10, 2020 and which is incorporated by reference herein.

FIELD OF THE INVENTION

The present invention relates to fiber composites, and more particularly, to a process for reducing the cycle time of a compression-molding process for fabricating fiber composite parts.

BACKGROUND

"Rapid heat cycle molding" (RHCM) is a process for reducing the cycle time of some molding processes. RHCM is typically very expensive to implement, and requires substantial amounts of power. Such solutions also require significant engineering to achieve even heating and cooling, and to avoid thermally induced cracking.

For the compression molding of thermoplastic composite materials, the mold (temperature) cycle time is usually the rate-limiting step in the process. However, there have been very few RHCM solutions for compression molding processes.

SUMMARY

The present invention provides a way to efficiently, rapidly, and cost effectively heat and cool compression molds, as used in a compression-molding process. Working with a compression mold having a core (male) portion and cavity (female) portion, the method includes, in some embodiments:
- placing an assemblage of feed constituents in the cavity portion of the mold;
- placing the mold between two hot platens of a hot press;
- heating the mold by pressing the two hot platens against the mold;
- placing the mold between two cold platens of a cold press;
- cooling the mold by pressing the two cold platens against the mold; and
- ejecting the part from the mold, and placing a subsequent assemblage of feed constituents in the cavity portion of the mold to repeat the process.

In some embodiments, the heating operation involves two phases, and may be conducted at one, two, or more different heating stations. In some embodiments, the cooling operation involves two phases, and may be conducted at one, two, or more different cooling stations. In some embodiments, the cooling operation is conducted at a somewhat higher pressure than the heating operating, and, for such embodiments, it is during the early part of the cooling operation that the feed constituents are fully consolidated.

In some embodiments, the invention provides a method for rapid heat cycle compression molding, comprising:
- a) positioning, at a first heating station, a mold containing of an assemblage of feed constituents, the first heating station having a first hot press including two platens, wherein the platens have a temperature that is above a processing temperature of a resin in the feed constituents;
- b) heating the mold by applying pressure to the mold by pressing the platens of the first hot press against the mold;
- c) transferring the mold to a first cooling station, the first cooling station having a first cold press including two platens, wherein the platens have a first temperature that is below the processing temperature of the resin;
- d) cooling the mold by applying pressure to the mold by pressing the platens of the first cold press against the mold, wherein the applied pressure is sufficient to fully consolidate the feed constituents, forming a composite part;
- e) ejecting the composite part when the mold reaches an ejection temperature, and loading a subsequent assemblage of feed constituents in the mold; and
- f) repeating a) through e).

In some embodiments, the invention provides a method for rapid heat cycle compression molding, comprising:
- (a) heating, in a first hot press having two heated platens, a mold containing an assemblage of feed constituents, wherein the mold is maintained under a first pressure;
- (b) transferring the mold to a second hot press having two heated platens, wherein pressure is increased from the first pressure to a second pressure that is greater than the first pressure;
- (c) transferring the mold, after a temperature of the mold exceeds a processing temperature, to a first cold press having two cooled platens, wherein pressure is maintained in the first cold press at a third pressure that is at least as high as the second pressure, and wherein the third pressure is sufficient to consolidate the assemblage of feed constituents;
- (d) cooling the mold by applying pressure to the mold by pressing the cooled platens against the mold, forming the composite part;
- (e) ejecting the composite part when the mold reaches an ejection temperature, and loading a subsequent assemblage of feed constituents in the mold; and
- (f) repeating a) through e).

BRIEF DESCRIPTION OF THE DRAWINGS

FIG. 2A depicts a first embodiment of an apparatus for carrying out the method of FIG. 1.

FIG. 2B depicts a second embodiment of an apparatus for carrying out the method of FIG. 1.

FIG. 2C depicts a third embodiment of an apparatus for carrying out the method of FIG. 1.

FIG. 3 depicts a chart showing temperature and pressure versus time for an embodiment of the RHCM in accordance with the present teachings.

DETAILED DESCRIPTION

Definitions

Figure 1:
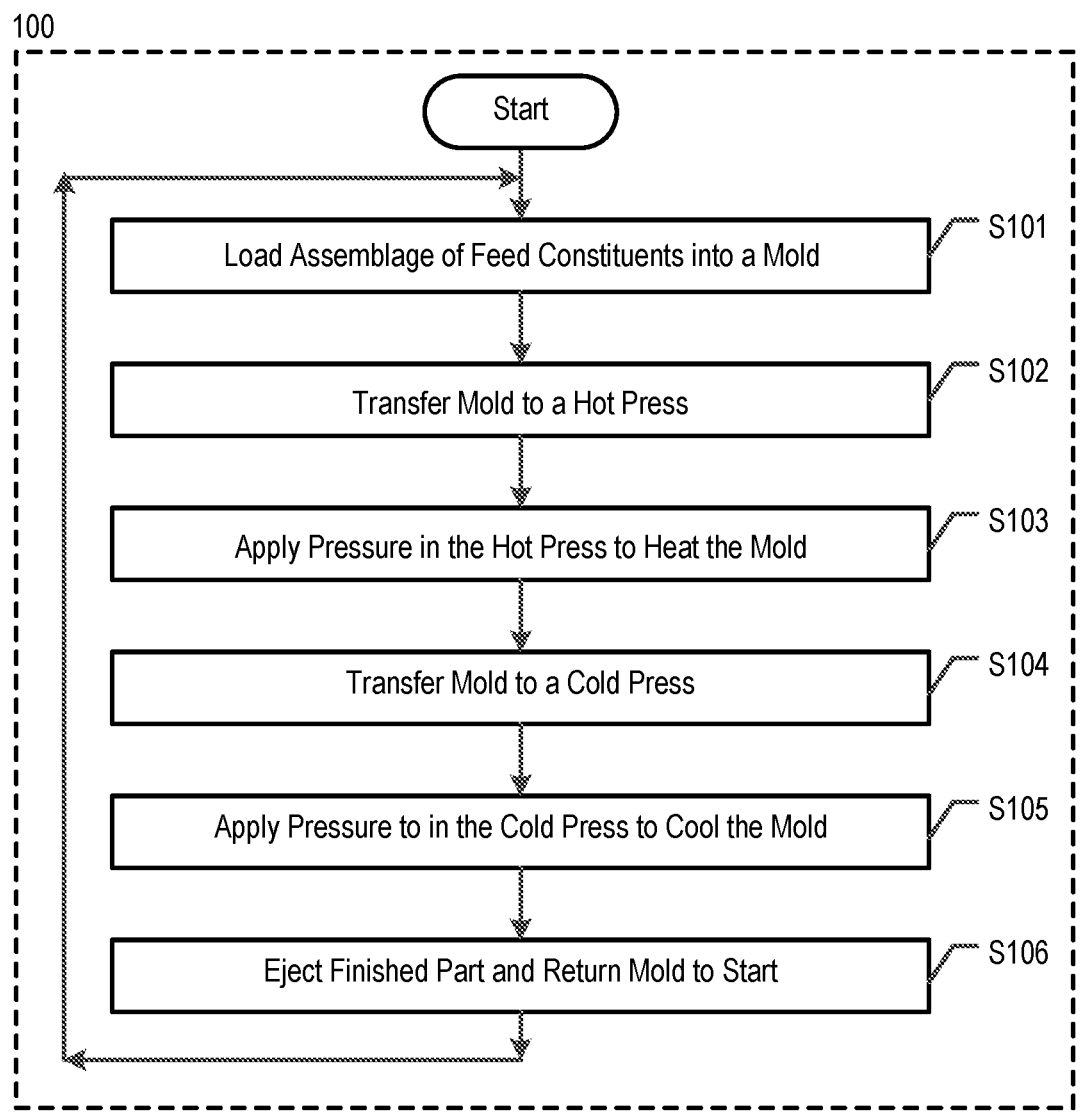
FIG. 1 depicts a block flow diagram of a method for RHCM in accordance with the illustrative embodiment of the invention.

The following terms are defined for use in this description and the appended claims:
"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.
"Prepreg" means fibers that are impregnated with resin.
"Towpreg" means a fiber bundle (i.e., a tow) that is impregnated with resin.

"Fiber-bundle-based preform" means a bundle of plural, unidirectionally aligned, same-length, resin-wetted fibers. The plural fibers in each bundle are typically present in multiples of a thousand (e.g., 1 k, 10 k, 24 k, etc.). The fibers align with the major axis of their host preform. The bundle is often (but not necessarily) sourced from a long length of towpreg. That is, the bundle is a segment of towpreg that has been cut to a desired size and, in many cases, is shaped (e.g., bent, twisted, etc.) to a specific form, as appropriate for the specific part being molded. Alternatively, the bundle of fibers can be sourced directly from impregnation processes, as known to those skilled in the art. Whatever the source, the fiber bundles, and hence the preforms, can have any suitable cross-section, such as, without limitation, circular, oval, trilobal, and polygonal. However, the aspect ratio (width-to-thickness) of the cross section is between about 0.25 to about 6. That is, a "fiber-bundle-based preform" is distinguished from relatively flat form factors, and explicitly excludes any size of shaped pieces of: (i) tape (typically having an aspect ratio—cross section, as above—of between about 10 to about 30), (ii) sheets of fiber, and (iii) laminates.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Compression molding" is a molding process that involves the application of heat and pressure to feed constituents for a period of time. For applicant's processes, the applied pressure is usually in the range of about 500 psi to about 3000 psi, and temperature, which is a function of the particular resin being used, is typically in the range of about 150° C. to about 400° C. Once the applied heat has increased the temperature of the resin above its melt temperature, it is no longer solid. The resin will then conform to the mold geometry via the applied pressure. Elevated pressure and temperature are typically maintained for a few minutes. Thereafter, the mold is removed from the source of pressure and is cooled. Once cooled, a finished part is removed from the mold.

"About" or "Substantially" means+/−20% with respect to a stated figure or nominal value.

Other definitions are provided elsewhere in this specification in context.

Feed Constituents.

The feed constituents used in conjunction with embodiments of the invention include fiber-bundle-based preforms, prepreg tape, long chopped prepreg, short chopped prepreg, neat resin pellets, or any combination of the foregoing. In use in conjunction with the present process, these constituents can be individually placed in a mold cavity as a "layup." Alternatively and preferably, to the extent the form factor of the constituents permit, one or more of any the aforementioned types of constituents can be grouped together and at least loosely bound together prior to placement in a mold cavity, so as to maintain their position relative to one another. Thus, a plurality of fiber-bundle-based preforms may be bound together. Or a plurality of fiber-bundle-based preforms and prepreg tape may be bound together, etc. Such a bound grouping of any one or more of the aforementioned types of feed constituents is referred to herein as a "preform charge." The shape of the preform charge usually mirrors that of the intended part, or at least a portion of it, and, hence, the mold cavity (or at least a portion thereof) that forms the part. See, e.g., Publ. Pat. App. US2020/0114596 and U.S. patent application Ser. No. 16/877,236, incorporated herein by reference. It is notable that the definition of preform charge, as provided herein, may differ somewhat from the definition provided in the aforementioned applications, as to the types of constituents that may be included in the preform charge.

As compared to a final part, in which fibers/resin are fully consolidated, in a preform charge, the preforms are only partially consolidated (lacking sufficient pressure and possibly even sufficient temperature for full consolidation). By way of example, whereas applicant's compression-molding processes are often conducted at a pressure of thousands of psi, the downward pressure applied to the constituents to create a preform charge in accordance with the present teachings is typically in the range of about 10 psi to about 100 psi. Thus, voids remain in a preform charge, and, as such, the preform charge cannot be used as a finished part. As used herein, the term "assemblage of feed constituents" refers to either a lay-up of the feed constituents, or a preform charge.

In some embodiments, the individual fibers in the feed constituents may include, without limitation, glass, natural fibers, carbon, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used. Hybrid yarns consisting of twisted or commingled strands of fibers and polymer filaments can also be used as preforms.

Suitable resins for use in conjunction with the embodiments of the invention include any thermoplastic. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC).

FIG. 1 depicts a block diagram of method 100 for RHCM in accordance with the illustrative embodiment of the present invention. As depicted, method 100 is continuous; however, in some other embodiments, the method can be operated batchwise. That is, in some embodiments, the sequence of operations depicted in method 100 is conducted to make a part without cycling to make a second part. In the illustrative embodiment, the compression mold being used has a female half, including a mold cavity to which the assemblage of feed constituents are added, and a male half or "mold core."

In operation S101, an assemblage of feed constituents is placed in the mold cavity. In the illustrative embodiment, method 100 is operated as a continuous process. Thus, the temperature and pressure conditions at the end of a cycle of the process are advantageously the same as those required to begin the cycle.

The pressure on the mold halves at the end of a cycle of method 100 is simply atmospheric pressure since, at that point, the mold has exited the cold press and is opened to eject the finished part. Likewise, the pressure at operation S101 is atmospheric pressure, since the mold is open as the assemblage of feed constituents is added.

The temperature at the end of a cycle of method 100 must be sufficiently low so that the finished part does not deform when it is ejected from the mold. The part can be subjected to significant force during ejection, as a function of the ejection mechanism. In general, subjecting the part to a relatively greater force necessitates that ejection occurs at relatively lower temperature to prevent deformation. Ejection temperature is thus best determined by routine experimentation, and is potentially unique for each part, since the shape of the part, not simply it's composition, will affect the tendency of the part to deform under applied force. The ejection temperature will thus set the loading temperature.

To mold a fiber-composite part via compression molding, the resin in the feed constituents must be sufficiently softened so that it can flow to fill all of the volume in the mold, and all void space between the fibers and resin is removed (i.e., full consolidation). Accomplishing this requires elevated temperature and elevated pressure.

To this end, in operation S102, the mold is transferred to a "hot press" including, in the illustrative embodiment, two hot platens. The platens are large in thermal mass relative to the mold to facilitate quick heating. The mold can be transferred by a robot, conveyor, shuttle, or the like. In some other embodiments, the mold includes more than two platens.

Per operation S103, the mold and the assemblage of feed constituents contained therein are ultimately heated to a "processing temperature" by pressing the two hot platens against the mold. The processing temperature is the temperature at which the resin is sufficiently softened for flowing and consolidation, as described above, under an applied pressure in the range of about 500 to 3000 psi. These platens must therefore be maintained at a temperature in excess of the processing temperature.

For a semi-crystalline thermoplastic polymer resin, the processing temperature is typically somewhat above its melting point. Since an amorphous thermoplastic polymer resin does not have a melting point, the processing temperature is simply somewhat above temperature at which the polymer softens at the applied pressure; that is, above the heat deflection temperature under the applied pressure.

Operation S103 is often the rate limiting step of the RHCM process disclosed herein. This is particularly true in situations in which a significant amount of feed-constituent consolidation is required, because (a) conducting heat through the typically low-thermal-conductivity feed constituents takes more time than conducting heat through the mold itself, and (b) it may be advantageous to keep the applied pressure relatively low so as to prevent breakage of the fibers in the assemblage of feed constituents until the resin therein softens.

In some embodiments, operation S103 is performed at a single station; that is, in a single hot press. However, in view of the fact that heating is typically the rate limiting step, as mentioned above, in the illustrative embodiment, operation S103 is conducted at two stations—two hot presses—via two sub-operations:
 (i) heating by applying relatively low, constant pressure via the platens, since some amount of pressure is necessary to ensure good thermal conduction between the hot platens and the mold, followed by
 (ii) rapidly increasing the pressure to near full consolidation pressure when the temperature of the mold and the assemblage of feed constituents approaches the processing temperature.

A motivation for conducting operation S103 at two stations is line balancing. That is, since it is advantageous for the processing at each station to take approximately the same amount of time, and since heating is the rate limiting step, conducting the heating at two stations provides twice the amount of time for heating as any other operation of method 100.

In the illustrative embodiment, the initial pressurization should be conducted at a pressure in the range of about 100 to about 500 psi based on the projected area of the part (i.e., the portion of the part that would be subject to the pressure, as projected on a plane normal to the axis of consolidation). As the temperature of the mold and its contents approach the processing temperature, the applied pressure is rapidly increased.

The final pressure during operation S103 is preferably in the range from 200-3000 psi. It is not necessary that the mold completely closes out in this step. In some embodiments, maximum pressure applied in operation S103 is less than full consolidation pressure. In fact, maximum pressure during the heating can be as much as 40% below full consolidation pressure. In this regard, and as discussed further below, it is often more important that full consolidation pressure is achieved during the cooling phase of method 100.

As disclosed above, these two pressurization operations may be conducted at two processing stations, one capable of applying a relatively lesser amount of pressure, and a second station capable of applying significantly greater pressure. In some other embodiments, a single station is used, where the pressure is applied as described above. In some additional embodiments, more than two heating stations (hot presses) can be used. It is within the capabilities of those skilled in the art to decide between the use of one, two, or more heating stations, as well as to select operating pressures for operation S103, in light of the present disclosure.

In some embodiments, pressure is steadily and rapidly increased before the mold and its contents reach the processing temperature. In some embodiments, the pressure is ramped immediately (i.e., when the mold is at the ejection temperature). In some other embodiments, temperature is ramped when the mold temperature is within about 25 degrees C. of the processing temperature.

In operation S104, the mold is transferred from the hot press to a cold press for cooling and, in some embodiments, full consolidation. In the illustrative embodiment, the cold press includes two cold platens. The mold is placed between these two platens. The two cold platens are large in thermal mass relative to the mold, to facilitate quick cooling, as desired. The mold can be transferred by a robot, conveyor, shuttle, or similar. In some other embodiments, the cold press includes more than two platens.

In operation S105, the feed constituents are cooled under the application of full pressure by the two cold platens of the cold press. In some embodiments, during the early portion of this operation, the consolidation of the feed constituents is completed (to the extent full consolidation has not been obtained during operation S103). For this reason, the mold must be transferred to the cold press before the temperature in the mold falls below the processing temperature of the resin. In some embodiments, however, the feed constituents are fully consolidated prior to the transfer to the cold press.

The pressure applied by the two platens results in good thermal conductivity between the cold platens and the mold, causing the mold to cool rapidly. The mold is cooled to the ejection temperature, which is determined as previously discussed, to prepare for the next cycle of the continuous process. It is notable that the ejection temperature may be, but is not necessarily, below the glass transition temperature $T_g$ of the resin.

In some embodiments, operation S105 comprises two sub-operations: (i) a first cooling operation, and (ii) a second cooling operation. In some embodiments, this occurs at two separate cooling stations (two separate cold presses), which typically necessitates cycling the pressure. That is, a ramp up to full consolidation pressure at the first cooling station for the first cooling operation, a ramp down of pressure (i.e., pressure reduced to no applied pressure) for the transfer to the second cooling station, and then a ramp up to full consolidation pressure for the second cooling operation.

In some embodiments, the two sub-operations involve two different cooling rates: (i) a first slower cooling rate, for example, cooling from the maximum temperature attained to an intermediate temperature, and then (ii) a faster cooling rate for the remainder of the cooling process. This technique is useful, for example, when processing certain resins, such as high performance semi-crystalline thermoplastics. The initial slower cooling rate can enhance crystallinity and mechanical properties.

In yet some other embodiments, the two sub-operations involve two quick cooling operations, wherein: (i) a first quick cooling to a given temperature (such as the crystallization temperature of a semi-crystalline thermoplastic polymer resin), and then dwelling at that temperature, and then (ii) a second quick cooling to the ejection temperature. The "dwell" can be implemented, for example, by prolonging the tool transition between the two cooling stations, or by having the first station's platens set to the dwell temperature. In some additional embodiments, more than three cooling stations (cool presses) can be used. It is within the capabilities of those skilled in the art to decide between the use of one, two, or more cooling stations, as well as to select operating pressures and temperatures for operation S105, in light of the present disclosure.

For amorphous thermoplastic polymer resins a single cooling station is typically used, since there are no concerns pertaining to "crystallization."

In operation S106, the mold halves are opened and the parts are ejected. This can occur while the mold is at the cold press by fixing each of the mold halves to each of the two sides of the press. To this end, an ejector system can be built into the cold platens. In some other embodiments, the mold is transferred to an ejection station and the part is ejected. The mold can be registered to the ejection station (for ejection of the part) by dowel pins, guide rails, or the like. The ejection station can use an actuated ejector plate in combination with ejector pins, for example, to eject parts.

FIGS. 2A through 2C depict several embodiments of apparatus 200 for practicing method 100.

FIG. 2A depicts apparatus 200A, including loading/ejection station 202, rail system 204A, hot press 206, cold press 208, and controller/processor 210. This embodiment of apparatus 200 has one heating station (hot press 206) and one cooling station (cold press 208).

In the illustrative embodiment, both hot press 206 and cold press 208 each include two platens (not depicted). The platens are made from a thermally conductive metal, such as aluminum, steel, etc. The platens in hot press 206 can be heated via resistance heaters, oil heaters, and the like (electrical/fluid lines, etc., not depicted). The platens in cold press 208 can be cooled via air, water, oil, or other means (fluid lines, etc., not depicted).

In some other embodiments, one or both of hot press 206 and cold press 208 include more than two platens. In some of such embodiments, some of the platens are not heated or cooled, but rather are used solely to apply consolidation pressure to the mold. Other of the platens are heated or cooled, as appropriate, but apply only minimal pressure (enough to create good contact for thermal exchange). Such an arrangement is typically used if the mold is tall in the direction of the applied pressure and thinner in the orthogonal direction. In such situations, the heating or cooling platens are abutted to the mold in a direction that is transverse to the direction of applied pressure. This permits heat to be conducted through the mold more rapidly than if applied to the "top" and "bottom" of the mold.

In some embodiments, different heating and cooling rates can be applied to different sections of a mold. This can be accomplished, for example, by introducing pockets (e.g., void regions, etc.) between the mold surface and the surface of the platens in areas where less heating or cooling is desired. The pockets prevent physical contact between the platen and mold at those regions, resulting in reduced heat transfer relative to other regions. Alternatively, a thin spacer can be used between the platens and the mold with cutouts at areas where less heating and cooling is desired.

In some embodiments, the amount of heating or cooling applied is adjusted by using heating and cooling platens that are divided into zones that can move relative to each other. The moving zone can be spring loaded to maintain good thermal conductivity throughout the molding cycle. This method can also be used to ensure good thermal conductivity with more complex molds, such as those having multiple sections that move relative to one another.

Controller/processor 210 is electrically connected to all elements of apparatus 200A via lines 212. The controller/processor controls rail system 204A to shuttle the mold to the various stations of apparatus 200A. In the illustrative embodiment, rail system 204A is on a rotary stage, which is what indexes the mold from one station to the next. In some other embodiments, a rotary stage is not used.

Additionally, controller/processor 210 controls the operation of all the stations, such as controlling the temperature of the platens and the pressure applied thereby.

In use of apparatus 200A, an assemblage of feed constituents is loaded into a mold (not depicted), at station 202, and is conveyed via rail system 204A to hot press 206, at which temperature and pressure are ramped as previously described (operation S103). The mold is then transferred via rail system 204A to cold press 208, wherein maximum pressure is attained and temperature is decreased to the ejection temperature. The mold is then returned via rail system 204A to loading/ejection station 202. In some embodiments, the mold is opened prior to leaving cold press

208; in some other embodiments, the mold is opened at loading/ejection station 202. After a finished part is ejected from the mold, another assemblage of feed constituents is added to the mold, and another cycle of method 100 is conducted.

FIG. 2B depicts apparatus 200B, including loading/ejection station 202, rail system 204B, hot press 206A, hot press 206B or cold press 208A, cold press 208B, and controller/processor 210. This embodiment of apparatus 200 has either two heating stations (hot presses 206A and 206B) and one cooling station (cold press 208B), or one heating station (hot press 206A) and two cooling stations (cold presses 208A and 208B).

Apparatus 200B accommodates embodiments of method 100 in which, as previously discussed, operation 103 includes two heating suboperations, or embodiments of method 100 in which, as previously discussed, operation 105 includes two cooling suboperations. To accommodate the extra press, rail system 204B has a different layout than rail system 204A.

FIG. 2C depicts apparatus 200C, including loading/ejection station 202, rail system 204C, hot press 206A, hot press 206B, cold press 208A, cold press 208B, and controller/processor 210.

Apparatus 200C accommodates embodiments of method 100 in which operation 103 includes two heating suboperations (as previously discussed) and in which operation 105 includes two cooling suboperations (as previously discussed). To accommodate the four presses, rail system 204C has a different layout than rail systems 204A or 204B.

In some other embodiments, apparatus 200 can include more than two hot presses and/or more than two cold presses, such as, for example, two increase processing capacity. Additionally, in some embodiments, the loading/ejection station can be segregated into two discrete stations.

FIG. 3 depicts a chart of temperature (reading to the left vertical axis) and pressure (reading to the right vertical axis) vs time for an embodiment of an RHCM process using one heating station and two cooling stations, such as for the processing of a semi-crystalline thermoplastic polymer resin. A slow cool is performed at the first station, and a fast cooling is performed at the second station. For process optimization, it is desirable that each station requires about the same amount of time.

The temperature cycle (dashed line, reading to the left) of the mold/constituent materials during operation of the method is as follows. A cycle begins with loading the assemblage of constituents into the mold cavity of mold. It is assumed that at least one cycle of the method has been completed, so that, as the cycle begins, the mold is at or near the ejection temperature.

Temperature is increased at the heating station to the processing temperature, which is unique for each resin. As previously discussed, the processing temperature is the temperature at which the resin can is sufficiently softened to flow and consolidate under the applied pressure. Some amount of temperature hold or slight overshoot can occur, as desired, to reach full consolidation or the required amount of consolidation before transferring to the cooling station. The temperature of the mold and its contents decrease at the cooling station and, in the embodiment depicted, cooling is conducted at two different rates at two different cooling stations. As previously noted, the two different cooling rates might be required for some semi-crystalline high-performance polymers for best matrix properties. Once the temperature decreases to the ejection temperature, the mold leaves the cold press and the part can be ejected.

The pressure cycle (solid line, reading to the right) is as follows. During the loading process, pressure is not applied to the mold. At the heating station, low pressure is initially applied to the assemblage of feed constituents to prevent compromising the integrity thereof. As the resin approaches the processing temperature, pressure is rapidly increased. As previously discussed, in some embodiments, the heating operation is conducted in two separate hot presses. In such embodiments, the first hot press is a smaller press (i.e., capable of applying less pressure) than the second hot press.

In some embodiments, such as depicted in FIG. 3, the final pressure during heating can be less than the maximum pressure applied during cooling (by as much as about 40%). There are several reasons for this. It is important for cosmetic and performance reasons to be operating at full pressure for full consolidation as a part cools. Consider that the greater the pressure, the larger the press. Since full pressure is required during the cooling operation(s), capital cost savings can be realized by operating at less than full pressure (i.e., using a smaller press) during heating operations. Moreover, performing heating operations at less than full consolidation reduces cycle time.

The mold is transferred to the first cooling station where maximum pressure for that mold is applied to achieve full consolidation. After a slow cool to achieve desired crystallinity, the mold is transferred to the second cooling station where maximum pressure for that mold is again applied until the mold cools to the ejection temperature. In some embodiments, the mold is then transferred to an ejection station, at which point there is no requirement for elevated pressure on the mold.

Embodiments of the present RHCM process can be applied to a single mold cycle, but the process is advantageously intended to operate as a continuous process. In accordance with the illustrative embodiment, ejection and load cycles are performed at the same station and each typically, but not necessarily, take half the total cycle time allotted for that station. The beginning temperatures and pressures match the ending temperatures and pressures, since the process is advantageously operated in a continuous manner.

It is to be understood that the disclosure describes a few embodiments and that many variations of the invention can easily be devised by those skilled in the art after reading this disclosure and that the scope of the present invention is to be determined by the following claims.

What is claimed:

1. A rapid heat cycle compression molding method for forming a composite part, the method comprising:
   a) positioning, at a first heating station, a mold containing of an assemblage of feed constituents, the first heating station having a first hot press including two platens, wherein the platens have a temperature that is above a processing temperature of a resin in the feed constituents;
   b) heating the mold by applying pressure to the mold by pressing the platens of the first hot press against the mold, wherein:
      (i) maintaining the pressure at a first pressure until a temperature of the mold is within about 25 degrees centigrade of the processing temperature of the resin;
      (ii) after the temperature of the mold is within about 25 degrees of the processing temperature, raising the pressure to a second pressure; and
      (iii) wherein the second pressure is within about 40 percent of the pressure required to fully consolidate the feed constituents, but less than the pressure required for full consolidation;
c) transferring the mold to a first cooling station, the first cooling station having a first cold press including two platens, wherein the platens have a first temperature that is below the processing temperature of the resin;
d) cooling the mold by applying pressure to the mold by pressing the platens of the first cold press against the mold, wherein the applied pressure is sufficient to fully consolidate the feed constituents, forming a composite part; and
e) ejecting the composite part when the mold reaches an ejection temperature.

2. The method of claim 1 wherein the second pressure is the pressure required to fully consolidate the feed constituents.

3. The method of claim 1 wherein after the temperature of the mold is within 25 degrees centigrade of the processing temperature, transferring the mold from the first heating station to a second heating station.

4. The method of claim 1 wherein cooling the mold comprises:
cooling the mold to a second temperature at the first cooling station, wherein the second temperature that is less than the processing temperature of the resin but greater than the ejection temperature;
transferring the mold to a second cooling station after the mold is cooled to the second temperature, wherein the second cooling station includes two platens that are maintained at a temperature that is less than the ejection temperature; and
applying pressure to the mold by pressing the platens of the second cold press against the mold until the temperature of the mold falls to the ejection temperature.

5. The method of claim 4 wherein the second temperature is a crystallization temperature of the resin.

6. The method of claim 4 wherein the mold cools more quickly in the second cold press than in the first cold press.

7. The method of claim 1 wherein the mold has a first section and a second section, and wherein applying pressure to the mold by pressing the platens of the first hot press against the mold comprises heating the first section at a first rate and heating the second section at a second rate that is different from the first rate.

8. The method of claim 1 wherein the mold has a first section and a second section, and wherein applying pressure to the mold by pressing the platens of the first cold press against the mold comprises cooling the first section at a first rate and cooling the second section at a second rate that is different from the first rate.

9. The method of claim 1 wherein the method is operated in continuous fashion.

10. A rapid heat cycle compression molding method for forming a composite part, the method comprising:
a) positioning, at a first heating station, a mold containing of an assemblage of feed constituents, the first heating station having a first hot press including two platens, wherein the platens have a temperature that is above a processing temperature of a resin in the feed constituents;
b) heating the mold by applying pressure to the mold by pressing the platens of the first hot press against the mold, wherein the pressure is maintained at a first pressure and a temperature of the mold is raised to a first temperature that is within about 25 degrees centigrade of a processing temperature of the resin;
c) when the temperature of the mold reaches the first temperature, transferring the mold to a second heating station having a second hot press including two platens;
d) at the second heating station, raising the pressure to a second pressure and raising the temperature of the mold to a second temperature that is in excess of the processing temperature, wherein the second pressure is insufficient to fully consolidate the feed constituents, and wherein the platens have a temperature that is above a processing temperature of a resin in the feed constituents;
e) transferring the mold to a first cooling station, the first cooling station having a first cold press including two platens, wherein the platens have a temperature that is below the processing temperature of the resin;
f) cooling the mold by applying pressure to the mold by pressing the platens of the first cold press against the mold, wherein the applied pressure wherein the applied pressure is greater than the second pressure and is sufficient to fully consolidate the feed constituents, forming a composite part; and
g) ejecting the composite part when the mold reaches an ejection temperature.

11. The method of claim 10 wherein cooling the mold comprises:
cooling the mold to a third temperature that is less than the processing temperature of the resin but greater than the ejection temperature; and
after the mold is cooled to the third temperature, transferring the mold to a second cold press after the mold is cooled to the second temperature, wherein the second cold press includes two platens that are maintained at a temperature that is less than the ejection temperature; and
at the second cold press, applying pressure to the mold by pressing the platens of the second cold press against the mold until the temperature of the mold falls to the ejection temperature.

12. A rapid heat cycle compression molding method for forming a composite part, the method comprising:
a) positioning, at a first heating station, a mold containing of an assemblage of feed constituents, the first heating station having a first hot press including two platens, wherein the platens have a temperature that is above a processing temperature of a resin in the feed constituents;
b) heating the mold by applying pressure to the mold by pressing the platens of the first hot press against the mold, wherein the mold is heated to a first temperature that is at least as high as the processing temperature, and pressurized to a first pressure;
c) transferring the mold to a first cooling station, the first cooling station having a first cold press including two platens, wherein the platens have a temperature that is below the processing temperature of the resin;
d) cooling the mold at the first cooling station by pressing the platens of the first cold press against the mold, wherein the mold is cooled to a second temperature that is less than the processing temperature of the resin but greater than an ejection temperature of the mold, and wherein the pressure applied by pressing the platens is sufficient to fully consolidate the feed constituents; and
e) after the mold is cooled to the second temperature, transferring the mold to a second cooling station having a second cold press, the second cold press having two platens that are maintained at a temperature that is less than the ejection temperature;

f) cooling the mold to the ejection temperature by applying pressure; and
g) ejecting the composite part when the mold reaches an ejection temperature.

13. The method of claim 12 wherein the second temperature is a crystallization temperature of the resin.

14. The method of claim 12 wherein the first pressure is insufficient to fully consolidate the feed constitutents.

15. A rapid heat cycle compression molding method for forming a composite part, the method comprising:
  a) positioning, at a first heating station, a mold containing of an assemblage of feed constituents, the first heating station having a first hot press including two platens, wherein the platens have a temperature that is above a processing temperature of a resin in the feed constituents;
  b) heating the mold by applying pressure to the mold by pressing the platens of the first hot press against the mold, wherein the mold is pressurized to a pressure that is insufficient to fully consolidate the feed constituents;
  c) transferring the mold to a first cooling station, the first cooling station having a first cold press including two platens, wherein the platens have a first temperature that is below the processing temperature of the resin;
  d) cooling the mold by applying pressure to the mold by pressing the platens of the first cold press against the mold, wherein the applied pressure is sufficient to fully consolidate the feed constituents, forming a composite part; and
  e) ejecting the composite part when the mold reaches an ejection temperature.

* * * * *